April 24, 1928.

J. W. FOLEY 1,667,348

ROLLER BEARING

Filed Feb. 9, 1927

Inventor:
John W. Foley

April 24, 1928.  
J. W. FOLEY  
ROLLER BEARING  
Filed Feb. 9, 1927

Inventor:
John W. Foley
By

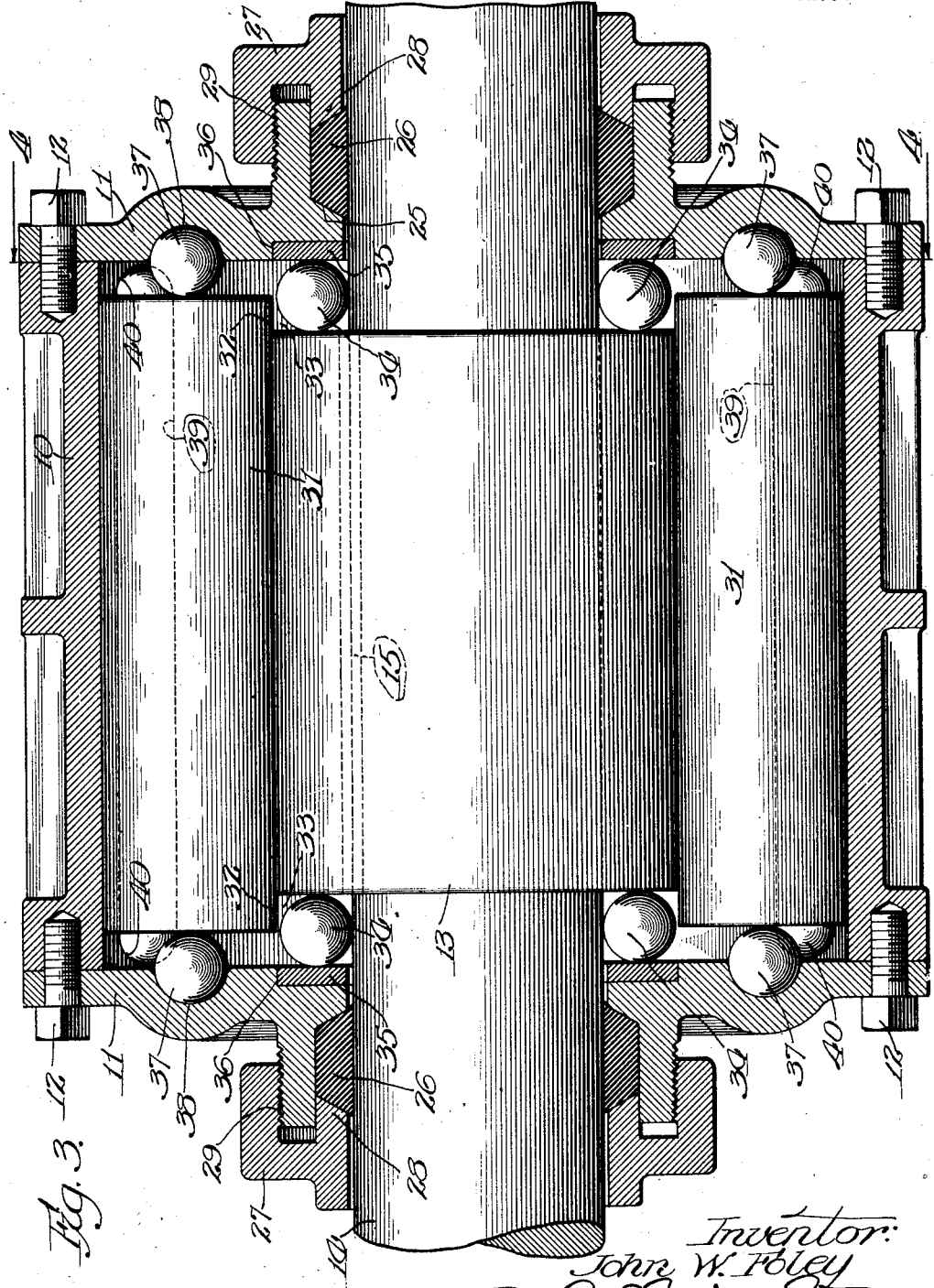

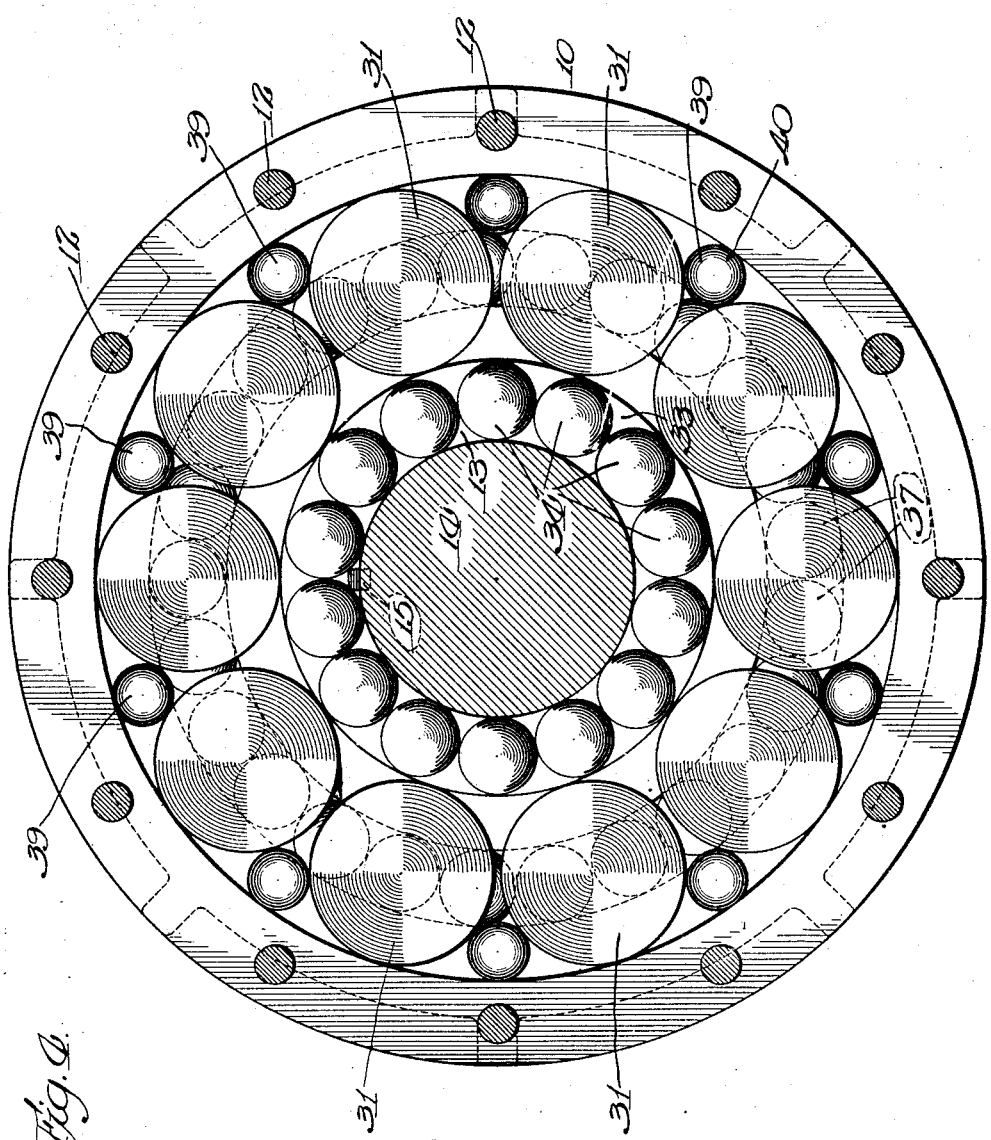

Patented Apr. 24, 1928.

1,667,348

UNITED STATES PATENT OFFICE.

JOHN W. FOLEY, OF CHICAGO, ILLINOIS.

ROLLER BEARING.

Application filed February 9, 1927. Serial No. 166,833.

This invention relates to improvements in roller bearings, and one of the objects of the invention is to provide an improved bearing of this character having means for reducing to a minimum both radial and thrust friction at all times whether the shaft which is journaled therein is operating in a horizontal or vertical position and in which bearing the cage heretofore commonly used for holding the balls or cylinders in a fixed relative position is dispensed with, thereby allowing the balls or cylinders to be free from each other and capable of following or rolling in any desired orbit.

A further object is to provide an improved bearing of this character so constructed and arranged that access may be readily had to the interior thereof.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a longitudinal sectional view of a bearing of this character constructed in accordance with the principles of this invention.

Figure 3 is a view similar to Figure 1 of another form of the invention.

Figure 4 is a sectional view taken on line 4—4, Figure 3.

Figure 1:
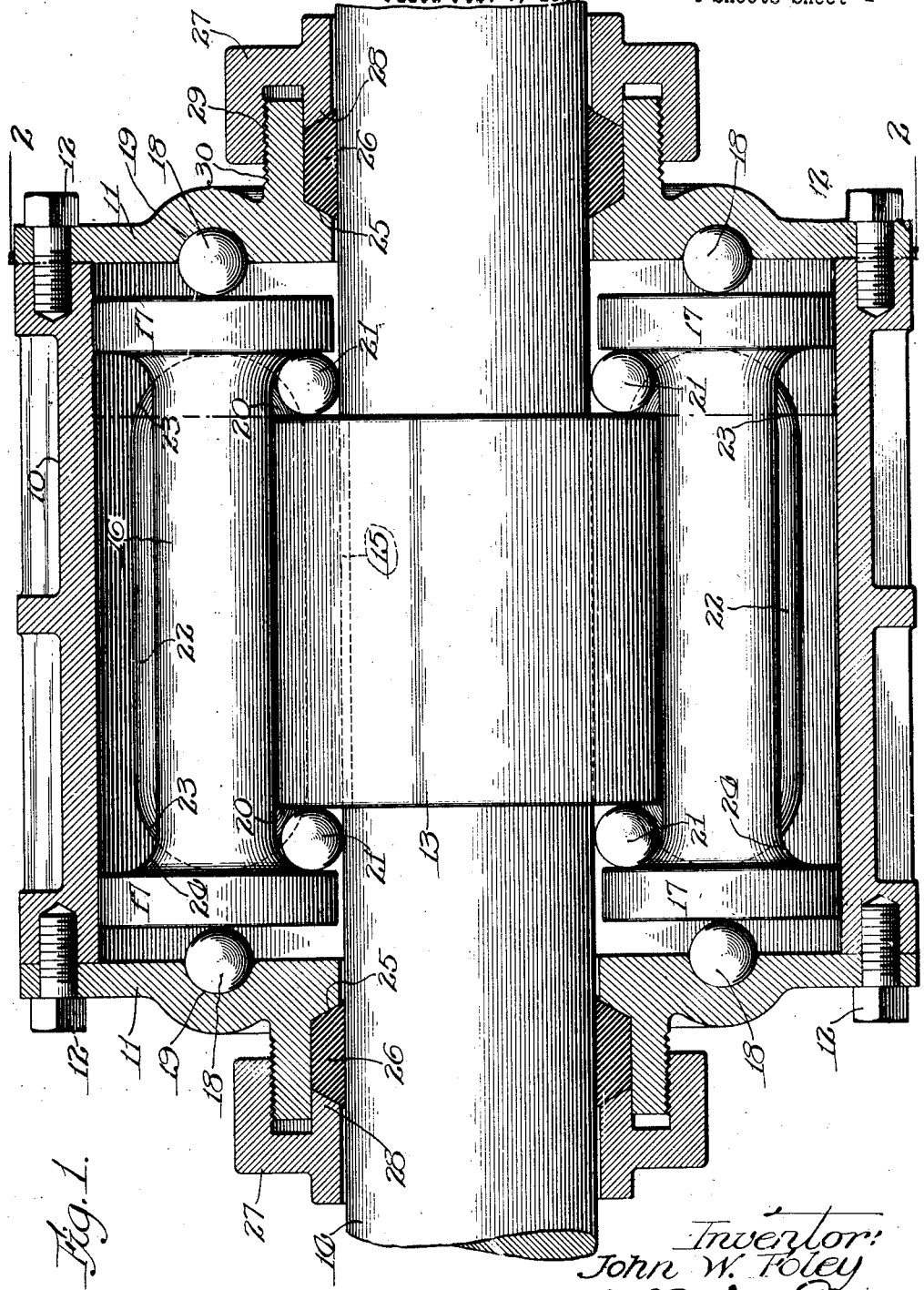
Figure 2:
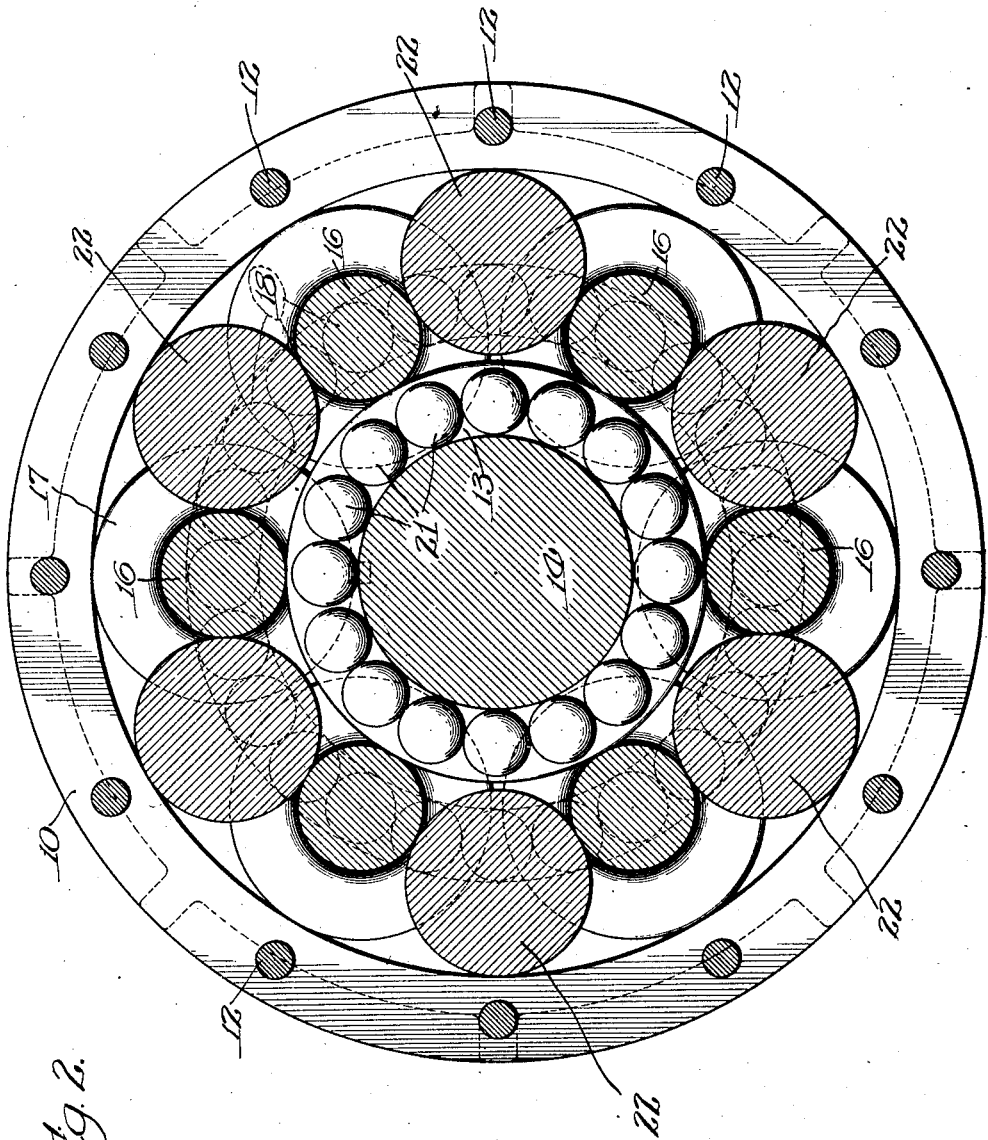
Figure 2 is a sectional view taken on line 2—2, Figure 1.

Referring more particularly to the drawings and to the form of the invention shown in Figures 1 and 2, the numeral 10 designates generally a journal box or housing in which the bearing is arranged. This box or housing is provided with removable end plates 11 secured in position in any suitable manner such as by means of fastening bolts 12.

The box or housing thus formed may be of any desired size and diameter according to the number of rollers that it is desired to be employed.

Arranged within the housing is a sleeve or collar 13 that is adapted to be removably secured to a shaft 14 in any suitable manner such as by means of a key or feather 15.

The collar or sleeve 13 is of a diameter somewhat larger than the diameter of the shaft to which it is secured and also considerably less in diameter than the interior diameter of the box in which it is arranged. The sleeve also is of a length considerably less than the length of the journal box for a purpose to be set forth.

Encompassing the sleeve or collar 13 are a plurality of rollers 16, any number of which may be used and these rollers are preferably of a cylindrical form having enlarged heads or ends 17. The combined length of the cylinders with the heads 17 is somewhat less than the length of the journal box so that balls 18 may be disposed between the respective end members 11 of the journal box and the proximate faces of adjacent ends of the heads 17 of the rollers 16.

The end plates or members 11 are provided with recesses 19 which extend circumferentially about the members 11 and are of a depth approximately equal to one-half of the diameter of the balls 18. These recesses or grooves 19 form channels in which the balls 18 are adapted to travel and the balls are held against displacement with respect to the grooves or channels by means of the ends of the rollers 16.

The diameters of the heads 17 are such that the heads will substantially fill the space between the periphery of the shaft 14 and the concentric wall of the journal box 11 and the body of the roller 16 is such that a space 20 will be formed between the inner faces of the heads 17 of the rollers 16 and the proximate adjacent end faces of the sleeve or collar 13.

Within this space thus formed a series of balls 21 are arranged and these balls are of a diameter to substantially fill the respective spaces and to contact with the shaft 14 as well as the respective end face of the sleeve or collar 13 and the adjacent inner face of the head 17 of the roller 16.

The body portion of the roller 16 contacts with the periphery of the sleeve.

It will therefore be seen that when the shaft 14 is rotated the sleeve or collar 13 will also be rotated and the balls 21 will reduce the friction between the shaft 14 and the roller 16 while at the same time the balls 18 will reduce the friction of the end thrust of the rollers and these friction reducing means will be rendered active at all times whether the shaft is rotating about a horizontal or an upright axis.

The rollers 16 and heads 17 are separated from each other so that the peripheries of the heads 17 will be held out of contact by means of intermediate rollers 22 which are also of a cylindrical configuration with the extremities 23 thereof rounded.

These intermediate rollers 22 may be of any desired diameter and are of a length substantially equal to the length of the space between the inner faces of the heads or ends 17 of the respective rollers 16 so that the rounded extremities of the rollers 22 will contact with the inner faces of the heads 17.

The point of junction between the body of the roller 16 and the heads 17 is preferably rounded as at 24 so as to form a runway for the balls 21 and also a bearing for the rounded ends of the intermediate rollers 22.

Each of the end plates 11 are provided with recesses 25 into which suitable packing 26 may be arranged and a packing nut 27 is provided which is sleeved upon the shaft 14 and is provided with a portion 28 adapted to enter the recess 25 to compress the packing 26 about the shaft 14.

The nut 27 is provided with internal screw threads 29 adapted to engage external screw threads 30 on the wall of the recess 25.

With this construction it will be manifest that any degree of pressure may be given to the packing 26, and when desired the entire end plate 11 with the packing nut thereon may be removed so that access may be readily had to the interior of the bearing.

In the form of the invention shown in Figures 3 and 4, the rollers 31, corresponding to the rollers 16 in the form of the invention shown in Figure 1, are of substantially the same diameter throughout their length and are supported by the sleeve 13. The ends of the rollers 31 overhang the extremities of the sleeve or collar 13 as at 32 to form spaces 33 in which spaces balls 34 operate. These balls 34 contact with the adjacent ends of the sleeve or collar 13 and also have contact with a wear or bearing plate 35, which is preferably recessed in the inner face of each of the respective end members 11, as at 36.

The rollers 31 are of a length considerably less than the length of the journal box and arranged between the respective ends of the rollers and the adjacent face of the respective end plates 11 are balls 37 which are seated in annular recesses or grooves 38 and which abut the adjacent ends of the rollers 31.

The rollers 31 are held spaced from each other or out of rolling contact by means of intermediate rollers 39 preferably in the form of cylinders which are of a length greater than the length of the rollers 31 and the extremities 40 of these rollers 39 are rounded and are adapted to contact with the inner faces of the end members 11.

The rollers 39 are preferably of a length just a little less than the length of the journal box 10 so that the ends of the rollers 40 may be held out of contact with the faces of the end members 11.

With this improved invention it will be manifest that there will be provided continuous rolling contacting surface equal at all points of the bearing, thereby reducing the friction to a minimum and the rollers and ball bearings are so arranged that the load will be equally distributed throughout the bearing.

It will also be manifest that with this improved construction the rollers and balls will be maintained in position without the use of the cage commonly used in bearings of this character, thereby permitting the balls and the cylinders to roll or follow any desired circuit or orbit and will roll freely about the shaft and the internal surface of the walls of the journal box.

The bearing will operate efficiently in any position, that is whether the shaft which is journaled in the bearing is rotated on a horizontal, vertical or inclined axis, and furthermore the amount of lubrication necessary for a bearing of this character will be reduced to a minimum.

While the preferred forms of the invention have been shown and described, it is to be understood that various changes may be made in the details of construction and in the combination and arrangement of the several parts, within the scope of the claims, without departing from the spirit of this invention.

What is claimed as new is:—

1. A roller bearing embodying a casing, a shaft extending therethrough, a sleeve carried by the shaft, said sleeve being of a diameter considerably less than the diameter of the casing and of a length to terminate short of the end walls of the casing, rollers between the sleeve and the casing and having a rolling contact with both, ball bearings between the casing end walls and the adjacent ends of the respective rollers, and elongated spacing rollers between adjacent first recited rollers.

2. A roller bearing embodying a casing, a shaft extending therethrough, a sleeve carried by the shaft, said sleeve being of a diameter considerably less than the diameter of the casing and of a length to terminate short of the end walls of the casing, rollers between the sleeve and the casing and having a rolling contact with both, ball bearings between the casing end walls and the adjacent ends of the respective rollers, grooves in the casing walls in which the said balls are freely rotatable in all directions and independent of each other, and elongated spacing rollers between adjacent first recited rollers.

3. A roller bearing embodying a casing, a shaft extending therethrough, a sleeve carried by the shaft, said sleeve being of a diameter considerably less than the casing and of a length to terminate short of the end walls of the casing, elongated rollers disposed between the sleeve and the casing and having rolling contact with both, said rollers being disconnected from each other and of a length greater than the said sleeve, whereby portions of the rollers will overhang the ends of the sleeve, ball bearings between the said overhanging portions and the shaft, and ball bearings between the ends of the first said rollers and the adjacent faces of the respective end walls of the said casing.

4. A roller bearing embodying a casing, a shaft bearing sleeve within the casing and of a diameter considerably less than the diameter of the casing and terminating short of the end walls of the casing, independent elongated rollers disposed between the periphery of the sleeve and the casing and having rolling contact with both, elongated spacing rollers arranged between adjacent rollers for maintaining them out of contact with each other, said spacing rollers being independent of each other and having rolling contact with the adjacent first recited rollers and the casing, ball bearings disposed between the end walls of the casing and the adjacent ends of the first recited rollers, and ball bearings engaging and operating against the ends of the said sleeve.

5. A roller bearing embodying a casing, a shaft journaled in the casing, circumferential shoulders on the shaft disposed adjacent but spaced from the end walls of the casing, the peripheries of the said shoulders being spaced from the encompassing wall of the casing, independent elongated rollers disposed between the shaft and casing and having rolling contact with both, independent elongated spacing rollers between adjacent rollers for maintaining the latter out of direct rolling contact, said spacing rollers having rolling contact with the casing and with the said adjacent rollers, the ends of the first said rollers co-operating with said shaft and said shoulders to form raceways, independent balls in said raceways, and independent balls between the extremities of the first said rollers and the respective end walls of the casing and having rolling contact with both.

6. A roller bearing embodying a casing, a shaft journaled in the casing, circumferential shoulders on the shaft disposed adjacent but spaced from the end walls of the casing, the peripheries of the said shoulders being spaced from the encompassing wall of the casing, independent elongated rollers disposed between the shaft and casing and having rolling contact with both, independent elongated spacing rollers between adjacent rollers for maintaining the latter out of direct rolling contact, said spacing rollers having rolling contact with the casing and with the said adjacent rollers, the ends of the first said rollers co-operating with said shaft and said shoulders to form raceways, independent balls in said raceways, independent balls between the extremities of the first said rollers and the respective end walls of the casing and having rolling contact with both, circumferential grooves in the faces of the said end walls and in which grooves the last said balls freely operate, and means removably securing the said end walls in position.

7. A roller bearing embodying a casing, a shaft journaled therein, circumferential shoulders on the shaft adjacent but spaced from the end walls of the casing, independent elongated rollers between the shaft and casing and encompassing the shaft and having rolling contact with the shaft and casing, independent elongated spacing rollers between the first said rollers for maintaining them out of direct rolling contact and having rolling contact with the first said rollers and the casing, independent ball bearings between the ends of the first said rollers and the respective adjacent face of the casing end walls and having rolling contact with both, bearing surfaces spaced from the respective adjacent faces of said shoulders to form with the shaft raceways, and independent balls in the said raceways.

8. A roller bearing embodying a casing, a shaft journaled therein, circumferential shoulders on the shaft adjacent but spaced from the end walls of the casing, independent elongated rollers between the shaft and casing and encompassing the shaft and having rolling contact with the shaft and casing, independent elongated spacing rollers between the first said rollers for maintaining them out of direct rolling contact and having rolling contact with the first said rollers and the casing, independent ball bearings between the ends of the first said rollers and the respective adjacent face of the casing end walls and having rolling contact with both, bearing surfaces spaced from the respective adjacent faces of said shoulders to form with the shaft raceways, and independent balls in the said raceways, portions of the first recited rollers projecting over the said raceways and serving to maintain the last said balls in the said raceways.

9. A roller bearing embodying a casing, a shaft journaled therein, circumferential shoulders on the shaft adjacent but spaced from the end walls of the casing, independent elongated rollers between the shaft and casing and encompassing the shaft and having rolling contact with the shaft and casing, independent elongated spacing rollers between the first said rollers for maintaining them out of direct rolling contact and having rolling contact with the first said rollers and the casing, independent ball bearings between the ends of the first said rollers and the respective adjacent face of the casing end walls and having rolling contact with both, bearing surfaces spaced from the respective adjacent faces of said shoulders to form with the shaft raceways, and independent balls in the said raceways, the extremities of the said spacing rollers being convexed to form rounded end bearings for said spacing rollers.

10. A roller bearing embodying a casing, a rotatable element in said casing shaped to form shoulders parallel with but spaced from the end members of the casing, independent elongated roller bearings disposed between said element and the casing and having direct rolling contact with both, said rollers projecting over and beyond the said shoulders, the ends of the rollers being enlarged and spaced from the respective said shoulders, the said roller and enlarged portions co-operating with the said element and the respective shoulders to form substantially closed raceways, independent balls in said raceway, independent balls between the end walls of the casing and the respective adjacent ends of the said rollers and having rolling contact with both, and spacing rollers between the adjacent first said rollers for maintaining them out of direct rolling contact.

11. A roller bearing embodying a casing, a rotatable element in said casing shaped to form shoulders parallel with but spaced from the end members of the casing, independent elongated roller bearings disposed between said element and the casing and having direct rolling contact with both, said rollers projecting over and beyond the said shoulders, the ends of the rollers being enlarged and spaced from the respective said shoulders, the said roller and enlarged portions co-operating with the said element and the respective shoulders to form substantially closed raceways, independent balls in said raceway, independent balls between the end walls of the casing and the respective adjacent ends of the said rollers and having rolling contact with both, and spacing rollers between the adjacent first said rollers for maintaining them out of direct rolling contact, the said spacing rollers having direct rolling contact with the said adjacent rollers and the casing.

12. A roller bearing embodying a casing, a rotatable element in said casing shaped to form shoulders parallel with but spaced from the end members of the casing, independent elongated roller bearings disposed between said element and the casing and having direct rolling contact with both, said rollers projecting over and beyond the said shoulders, the ends of the rollers being enlarged and spaced from the respective said shoulders, the said roller and enlarged portion co-operating with the said element and the respective shoulders to form substantially closed raceways, independent balls in said raceway, independent balls between the end walls of the casing and the respective adjacent ends of the said rollers and having rolling contact with both, and spacing rollers between the adjacent first said rollers for maintaining them out of direct rolling contact, the said spacing rollers having direct rolling contact with the said adjacent roller and the casing, the extremities of the spacing rollers being convexed and having rolling contact with the proximate faces of the adjacent enlarged portions of the first said rollers.

In testimony whereof I have signed my name to this specification on this 2nd day of February, A. D. 1927.

JOHN W. FOLEY.